(12) United States Patent
Maeyama

(10) Patent No.: US 8,017,219 B2
(45) Date of Patent: Sep. 13, 2011

(54) PROCESS FOR MAKING A MINERAL BATTERY

(75) Inventor: Mitsuo Maeyama, Chigasaki (JP); Tsukasa Sakai, legal representative, Chikuma (JP)

(73) Assignee: Unique Stones, Inc., Los Angeles, CA (US)

( * ) Notice: Subject to any disclaimer, the term of this patent is extended or adjusted under 35 U.S.C. 154(b) by 947 days.

(21) Appl. No.: 11/477,993

(22) Filed: Jun. 28, 2006

(65) Prior Publication Data

US 2008/0003499 A1    Jan. 3, 2008

(51) Int. Cl.
*H01M 6/04* (2006.01)
(52) U.S. Cl. ........................................ 428/188
(58) Field of Classification Search .................... 429/188
See application file for complete search history.

(56) References Cited

U.S. PATENT DOCUMENTS 5,601,909 A * 2/1997 Kubo ............................ 442/417
2005/0052814 A1* 3/2005 McNally et al. .............. 361/166

FOREIGN PATENT DOCUMENTS

WO    WO 02/031895    * 4/2002

* cited by examiner

*Primary Examiner* — Patrick Ryan
*Assistant Examiner* — Thomas H. Parsons
(74) *Attorney, Agent, or Firm* — Lawrence S. Cohen

(57) ABSTRACT

The present invention provides a process for making a mineral battery using treated powdered polar crystal mineral and a treated liquid as an electrolyte. The polar crystal powder and liquid are either separately or after mixing together subjected to a rotating EMF. The powder-liquid mixture is inserted into a housing and compacted therein to form a mineral battery, along with an anode and a cathode and terminals. The preferred polar crystal mineral is tourmaline. In one embodiment, after the mixture is in the housing it is subjected to a voltage. In one embodiment the mixture is prepared and compacted into the housing and then subjected to a rotating EMF, and may then also be subjected to application of a voltage.

31 Claims, 8 Drawing Sheets

OR

PROCESS FOR MAKING A MINERAL BATTERY

BACKGROUND

Crystal structures can be divided into 32 classes, or point groups, according to the number of rotational axes and reflection planes they exhibit that leave the crystal structure unchanged. Twenty of the 32 crystal classes are piezoelectric. All 20 piezoelectric classes lack a center of symmetry. Any material develops a dielectric polarization when an electric field is applied, but a substance which has such a natural charge separation even in the absence of a field is called a polar material. Whether or not a material is polar is determined solely by its crystal structure. Only 10 of the 32 point groups are polar. All polar crystals are pyroelectric, so the 10 polar crystal classes are sometimes referred to as the pyroelectric classes. Polar crystals have opposite charges on opposite crystal faces.

Of the polar crystal minerals, tourmaline is a group name for about thirteen species of minerals that exhibit piezoelectrical characteristics. The Tourmaline group are silicated minerals containing boron, and they belongs to a trigonal or hexagonal, hemimorphic, hemihederal group. Its hemimorphisms are asymmetric with respect to the major axis, and its chemical formulae are complicated. A typical formula is:

$$WX_3Y_6\{NaX_3Al_6(BO_3)_3Si_6O_{16}(O,OH,F)_4\} \text{ Where}$$
$$W=Ca, K, Na$$

$$X=Al, Fe2+, Li$$

$$Y=Al, CR3+, Fe3+$$

Natural tourmaline occurs in crystalline schist, gneiss, contact metamorphic rocks, and pegmatite. Tourmaline is capable of being obtained in large crystalline form.

The following is a set of data for tourmaline taken from the web site http://en.wikipedia.org/wiki/Tourmaline:

| Category | Mineral Group |
|---|---|
| General Chemical formula | $Na(Al,Fe,Li,Mg,Mn)M_3Al(Si_6O_{18})(BO_3)_3(OH,F)_4$ |
| 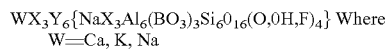 | Identification |
| Color | Most commonly black, but can range from brown, violet, green, pink, or in a dual-colored pink and green. |
| Crystal habit | Parallel and elongated. Acircular prisms, sometimes radiating. Massive. Scattered grains (in granite). |
| Crystal system | Trigonal |
| Cleavage | Good to poor prismatic. Poor rhombohedral |
| Fracture | Subconchoidal to even |
| Mohs Scale hardness | 7-7.5 |
| Luster | Vitreous, sometimes resinous |
| Refractive index | $n\omega = 1.635\text{-}1.675$  $n\epsilon = 1.610\text{-}1.650$ |
| Pleochroism | None |
| Streak | Colorless |
| Specific gravity | 3.02-3.26 |
| The 14 recognized minerals in the group (end member formulas) | |
| Elbaite | $Na(Li_{1.5},Al_{1.5})Al_6Si_6O_{18}(BO_3)_3(OH)_4$ |
| Schorl | $NaFe^{2+}_3Al_6Si_6O_{18}(BO_3)_3(OH)_4$ |
| Dravite | $NaMg_3Al_6Si_6O_{18}(BO_3)_3(OH)_4$ |
| Chromdravite | $NaMg_3Cr_6Si_6O_{18}(BO_3)_3(OH)_4$ |
| Olenite | $NaAl_3Al_6Si_6O_{18}(BO_3)_3O_3OH$ |
| Buergerite | $NaFe^{3+}_3Al_6Si_6O_{18}(BO_3)_3O_3F$ |
| Povondraite | $NaFe^{3+}_3(Fe^{3+}_4Mg_2Si_6O_{18}(BO_3)_3(OH)_3O$ |
| Vanadiumdravite | $NaMg_3V_6Si_6O_{18}(BO_3)_3(OH)_4$ |
| Liddicoatite | $Ca(Li_2Al)Al_6Si_6O_{18}(BO_3)_3(OH)_3F$ |
| Uvite | $CaMg_3(MgAl_5Si_6O_{18}(BO_3)_3(OH)_3F$ |
| Hydroxy-feruvite | $CaFe^{2+}_3(MgAl_5Si_6O_{18}(BO_3)_3(OH)_4$ |
| Rossmanite | $(LiAl_2)Al_6Si_6O_{18}(BO_3)_3(OH)_4$ |
| Foitite | $(Fe^{2+}_2Al)Al_6Si_6O_{18}(BO_3)_3(OH)_4$ |
| Magnesiofoitite | $(Mg_2Al)Al_6Si_6O_{18}(BO_3)_3(OH)_4$ |

A characteristic of tourmaline is that the crystal is electrically polarized on one axis of the crystal. In its natural state there is a potential difference that exists along the face of one side of the crystal. The tourmaline crystal also distorts when an electric field is placed across the crystal.

Batteries are used to supply electric energy and are well known in the arts. The standard design of a battery consists of a metallic anode, a metallic cathode, separated by an electrolyte material. The generation of electricity is accomplished by separating the reactive components so that the transfer of energy must take place through an external circuit. The anode is the cell electrode where chemical oxidation occurs. The cathode is where chemical reduction occurs in the cell. The cell electrolyte completes the electric circuit by causing the flow of positive and negative ions (called cations and anions, respectively) between the anode and cathode. (See the Chemical Engineer's Handbook, John H. Perry's, 4$^{th}$ edition, 1963, McGraw Hill, pp. 25-25).

A United States patent application publication to Jyoya (Mar 10, 2005, Jyoya, US 2005/0052824) describes a battery using volcanic ash and other mineral ores. This application mentions 'other mineral ores' including the minerals of the tourmaline group. The construction of a battery of this type provides a generating potential of 1V (unloaded), 0.5V (loaded with a external resistance of 1K) and a current of 0.5 milliamperes.

A mineral battery is described in a Japanese patent to Maeyama (18 Apr. 2002, Maeyama, 02/31895, PCT/JP00/07059). This device consists of a powder of polar crystal material with water content of more than 5 mass % in a battery housing having an outer wall and with an anode, a cathode and with respective terminals. The preferred embodiment is created from the tourmaline group.

U.S. Pat. No. 5,601,909 to Kubo (Feb. 11, 1997), describes the fabrication of tourmaline to create 'permanent electrodes' by creating conditions to align the crystal structures.

A polar crystal battery (hereinafter called a "polar mineral battery") can be constructed by placing powdered polar crystal material with an electrolyte in a container, with terminals for the anode and cathode electrical connections. However, simply putting the materials together does not result in a useful battery. The present invention is a method for constructing a useful battery.

DETAILED DESCRIPTION

Exemplary construction of a polar mineral battery is shown in the WIPO publication number WO 02/31895, the content of which is incorporated herein by reference according to the English language translation made a part of this description as Attachment "A". In this description the term "battery" can mean a single cell battery or a cell of a multi-cell battery, and the term "cell" generally means a cell of a multi-cell battery.

The present invention resides in a method or methods of making an operable polar mineral battery. As will be seen, the broadest embodiment of the invention resides in use of a polar crystal mineral, and more narrowly, tourmaline as a preferred polar crystal mineral and a process to energize the polar crystal mineral. In a more particular embodiment the polar crystal material is energized by exposing it to a rotating EMF (REMF). Other steps and alternative embodiments are described below.

Figure 1:
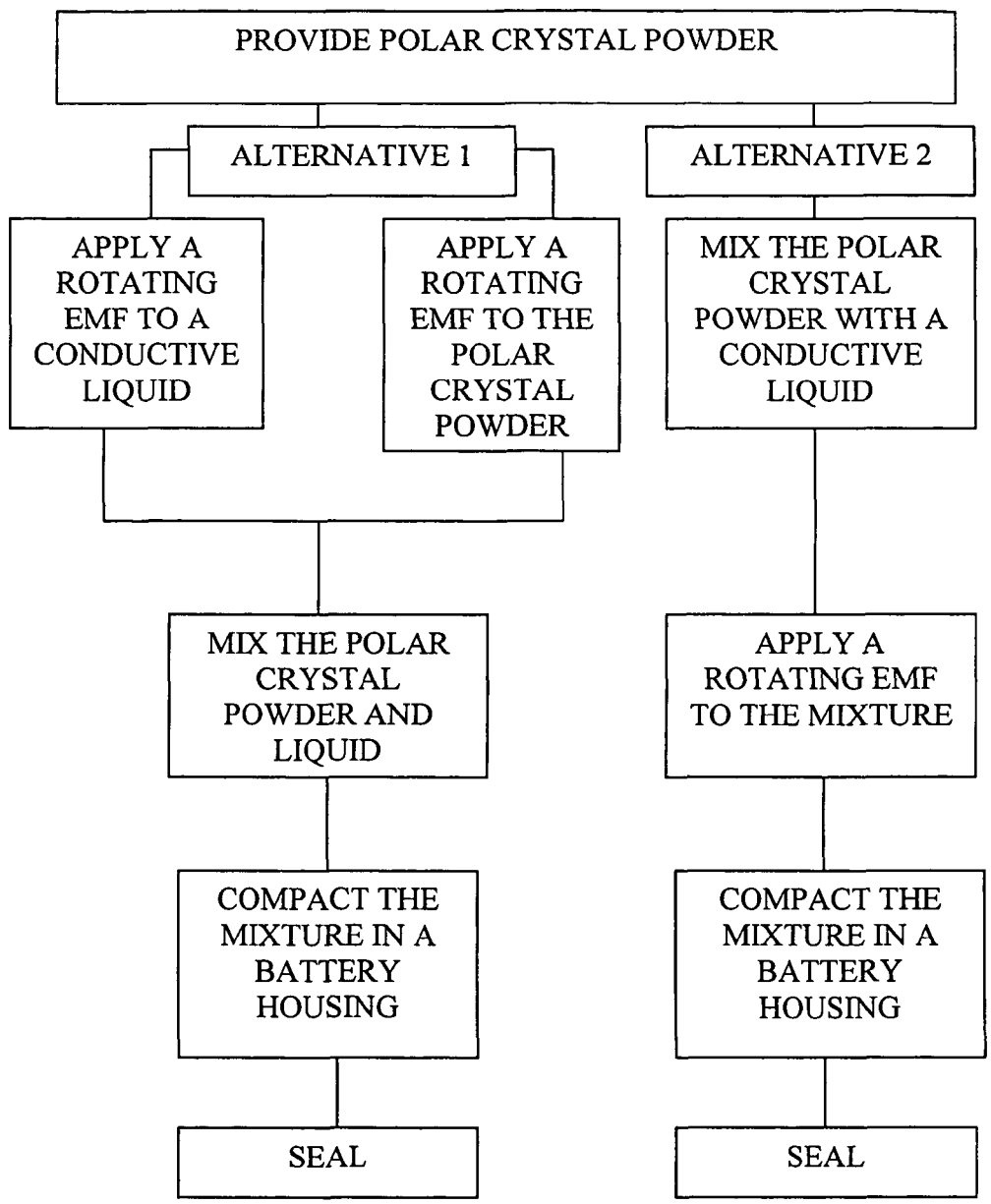
FIG. 1 is a flow chart of steps for making a battery according to embodiments of the invention.

Steps for embodiments of the present invention are shown in FIG. 1. There are shown as two alternatives, Alternative 1 and Alternative 2. Other embodiments are described below.

The first step refers to the polar crystal material. Higher purity of the polar crystal material produces better performance. The preferred material is tourmaline. The material is rendered into a finely ground powder form by known means. The particle size range can be from sub-micron to about 400 mesh. While there is no lower limit to the particle size (all particle sizes referred to herein are average particle size, based on known measurement standards), it is considered that to obtain particle size under 1 micron is not cost effective with relation to the increased electromotive force available from smaller particle size. Further there is no upper limit but when over about 1 mm, the level of decrease of electromotive force is undesirable, therefore a preferred upper limit is about 1 mm. This results in a preferred particle size range of from about 1 micron to about 1 mm. A more preferred particle size is between about 2-5 microns.

A preferred material is tourmaline and its particle size range is as above, more preferably, about 3 microns.

A conductive liquid is selected. Water is the preferred liquid but other conductive liquids such as alcohol can be used. While tap water can be used, purer water is preferred. Distilled water is not recommended due to its lower conductivity. The quantity of water should be more than about 5%, more desirably over about 10%. It should be under about 30%, and more desirably under about 20%. A preferred range for the water is about 17-18%. The measurement of water content is done by comparing the difference in the mass weight of dried powder with the mass weight of powder divided by the mass weight of dried powder, this will be referred to as mass percent and is the standard for percentages herein unless the description is expressly different.

Dried tourmaline powder is produced by placing a tourmaline powder in an oven at 105° C. for a period of 1 hour.

It is also appreciated that when the polar crystal powder is prepared by crushing in air with 60-70% relative humidity, the air will contain about 6-8% of water content, in which case it can be used without additional water, or if a higher percentage of water is desired, it can be added to obtain a desired percentage of water.

Referring to FIG. 1; first the polar crystal powder is provided as described above.

Then, according to Alternative 1, the conductive liquid, such as water is subjected to an REMF, and separately, the polar crystal powder is also subjected to a REMF. Details of the REMF are described below. Then, the now energized polar crystal powder and liquid are mixed together to produce a mixture. The mixing step is described below. Then the mixture is compacted in a suitable battery housing and sealed.

Now referring to Alternative 2, it differs from Alternative 1 in that the conductive liquid and the polar crystal powder are first mixed to produce the mixture. Then the mixture is subjected to an REMF. Then the now energized mixture is compacted in suitable battery housing and sealed. This alternative 2 is the preferred method of those in FIG. 1. Various conductive liquids can be used such as water and alcohol. It is considered, with respect to the use of water, that purified water will provide better results. It is also considered that alcohol will provide higher current but for a shorter time. The preferred water percent is about 17% to about 18%.

As will be described below the battery resulting from these and in fact all alternatives will have an anode and a cathode embedded in the compacted mixture in the battery housing and connected to them connecting means to enable connection of the battery into a circuit.

Figure 4:
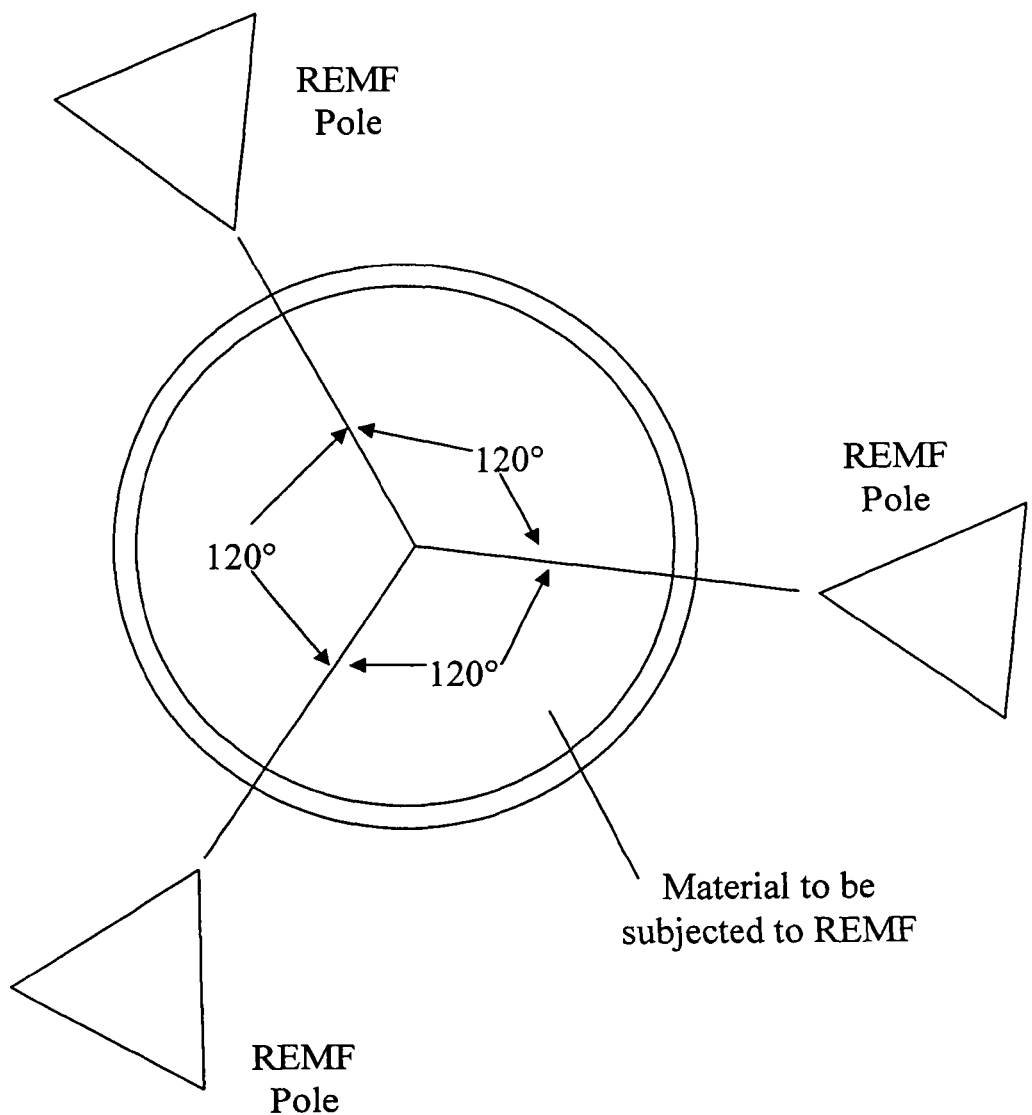
FIG. 4 is a diagrammatic drawing of a three pole rotating EMF with the material to be treated in the center.

The process of applying to the selected material the REMF is accomplished by placing it in the center of an REMF mechanism as shown diagrammatically in FIG. 4.

In summary, as shown in FIG. 1 in Alternative 1, the REMF is applied separately to the polar crystal material and the conductive liquid while in Alternative 2, the polar crystal material and the conductive liquid are mixed first. The preferred method is Alternative 2.

Application of the REMF improves the ability to obtain electricity from the battery, and it is considered that this is due to the EMF improving alignment of the charged crystals. The REMF is preferably provided using a three-pole mechanism that generates the REMF (see FIG. 4), the poles being located 120 degrees apart. Generally, applying the REMF longer will improve results. The length of time of application of the REMF is selected in order to obtain effect on the polar crystal material to a satisfactory degree. In the preferred embodiment the REMF is applied for a period of at least about 30 minutes to about 1 hour.

The REMF is applied at a selected frequency. Preferably a REMF frequency in the range of at least about 48 MHz to about 800 MHz is applied to the mixture of polar crystal material and liquid (Alternative 2). It is considered that for Alternative 1, in which the polar crystal material is treated separately, the frequency range is at least about 48 MHz to about 3 GHz. The frequency range for the liquid alone in Alternative 1 is preferably in the range of at least about 48 MHz to about 800 MHz, preferably from about 700 MHz to about 800 MHz.

With respect to the compacting step of Alternatives 1 and 2 of FIG. 1, it is performed with sufficient compaction to substantially expel air (which is nonconductive) entrained in the mixture. The compaction will also push the material particles closer together and increase the contact area of particles, which is considered to result in higher current. Also, the compaction will increase the amount of material in the battery, which will enhance its performance. While there may be some piezoelectric effect by this step, that is not the purpose. The compaction should preferably exceed about 3 atmospheres.

With respect to the sealing step of Alternatives 1 and 2, it is important to seal the battery quickly.

Figure 2:
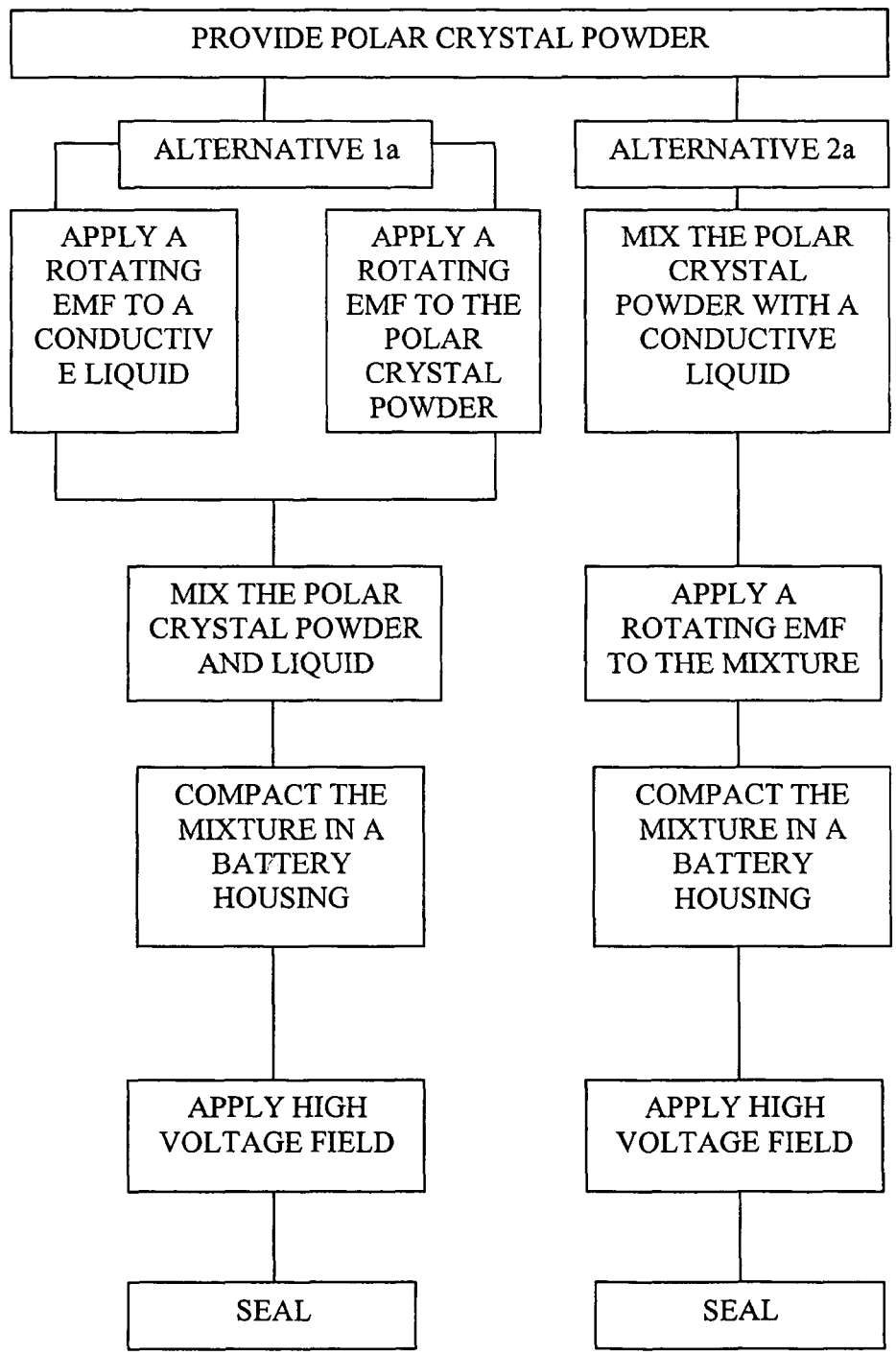
FIG. 2 is a flow chart of steps for further embodiments of the invention.

FIG. 2 shows the steps of the above procedure but with an additional step in each of Alternatives 1 and 2 the processes being designated alternative 1a and 2a respectively. That additional step is to apply a high voltage to the material in the battery housing, before sealing, that material of course now comprising the polar crystal material and the liquid that has been subjected to the REMF treatment and has been compacted into the battery housing.

Figure 3:
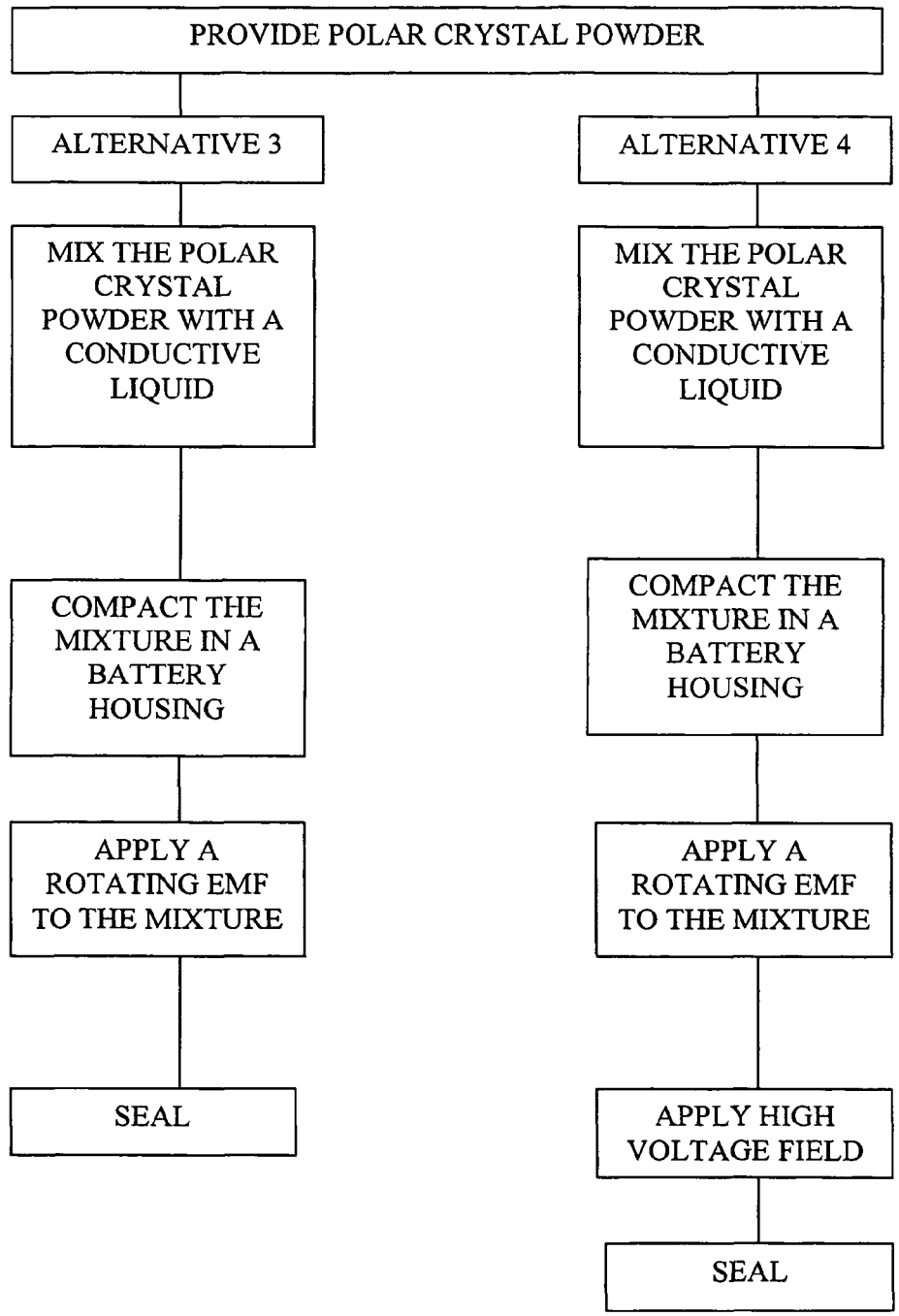
FIG. 3 is a flow chart of the steps for further embodiments of the invention

FIG. 3 shows further alternatives, Alternative 3 and Alternative 4. In each of Alternatives 3 and 4, the mixture of polar crystal material and conductive liquid are first put into the housing (for the battery) and are then subjected to the REMF. This avoids transferring the mixture after application of the REMF since such transfer may degrade the effect of the REMF. In Alternative 4 the application of high voltage after application of the REMF is included, but in Alternative 3 it is omitted. It is considered that when the REMF is applied while the mixture is already in the housing that application of the voltage may not be necessary; however in Alternative 4 it is used nevertheless as it is considered to enhance the current available.

Figure 5:
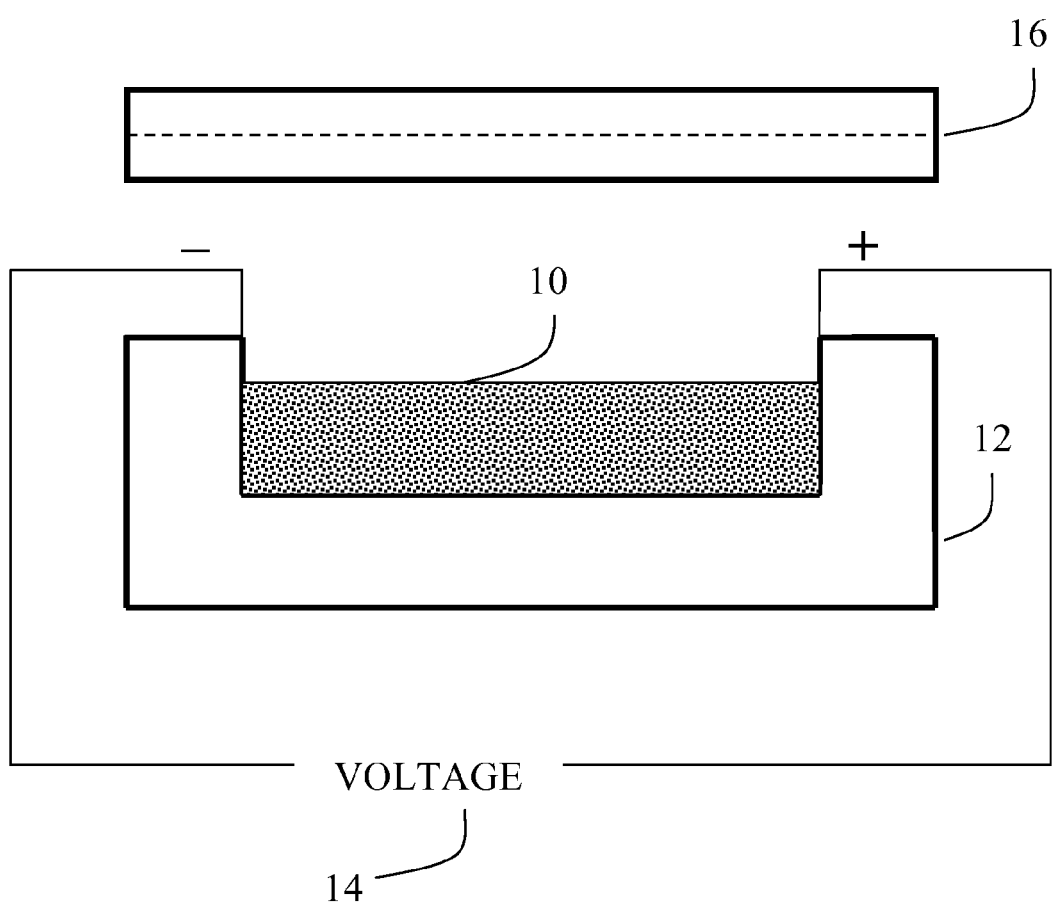
FIG. 5 is a diagrammatic drawing for the step of applying a voltage according to an embodiment of the invention

FIG. 5 shows schematically application of the high voltage. A preferred voltage is about 50,000 volts. The mixture of polar crystal material and liquid 10 is in a battery housing 12, and a voltage source 14 is connected and the voltage applied. The cover 16 is then put over the battery housing 12. Not shown are the conventional additional parts of a battery, which are well known, the anode, the cathode and terminals all of which are described and shown in the above referenced WIPO publication number WO 02/31895

After passing the voltage through the mixture, the battery is sealed, and it is still important to seal it quickly after the voltage treatment.

Exemplary construction alternatives of a polar mineral battery that may be applied to the present invention are shown in the WIPO publication number WO 02/31895, referred to above.

Figure 6:
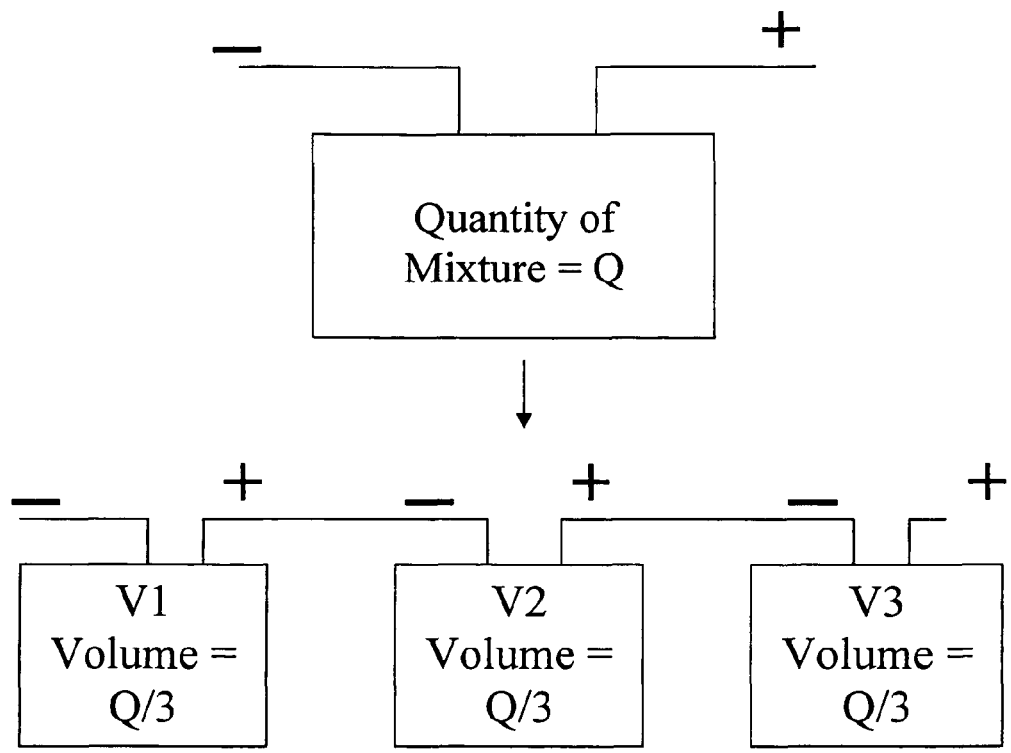
FIG. 6 is a schematic diagram for configurations of series and parallel mineral batteries to increase either voltage and/or current.
Figure 6:
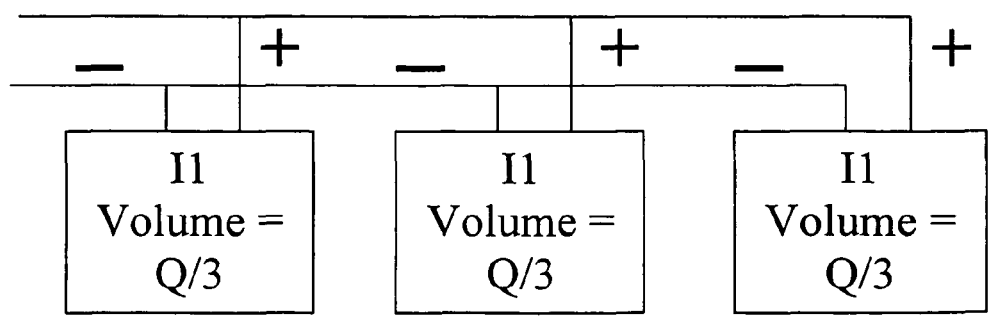

For a given quantity of polar crystal material and liquid mixture, dividing it up into separate batteries, or separate battery cells and connecting them in series and/or parallel gives better output than using the total volume as one battery or cell. This is schematically illustrated in FIG. 6. By configuring multiple mineral batteries or cells in series, the total electric potential may be increased in an additive fashion as shown in FIG. 6. By configuring multiple mineral batteries in parallel, the amount of current available may be increased in an additive fashion as shown in FIG. 6.

Assuming that the mixture is homogeneous, as it should be, the quantity Q can be divided by either volume or weight. The illustration showing division into three batteries or cells is exemplary as the number of divisions will depend on the practical manufacture of mixtures and the division into a battery having a number of such cells; all of which can be determined according to the desired commercial products.

Figure 7:
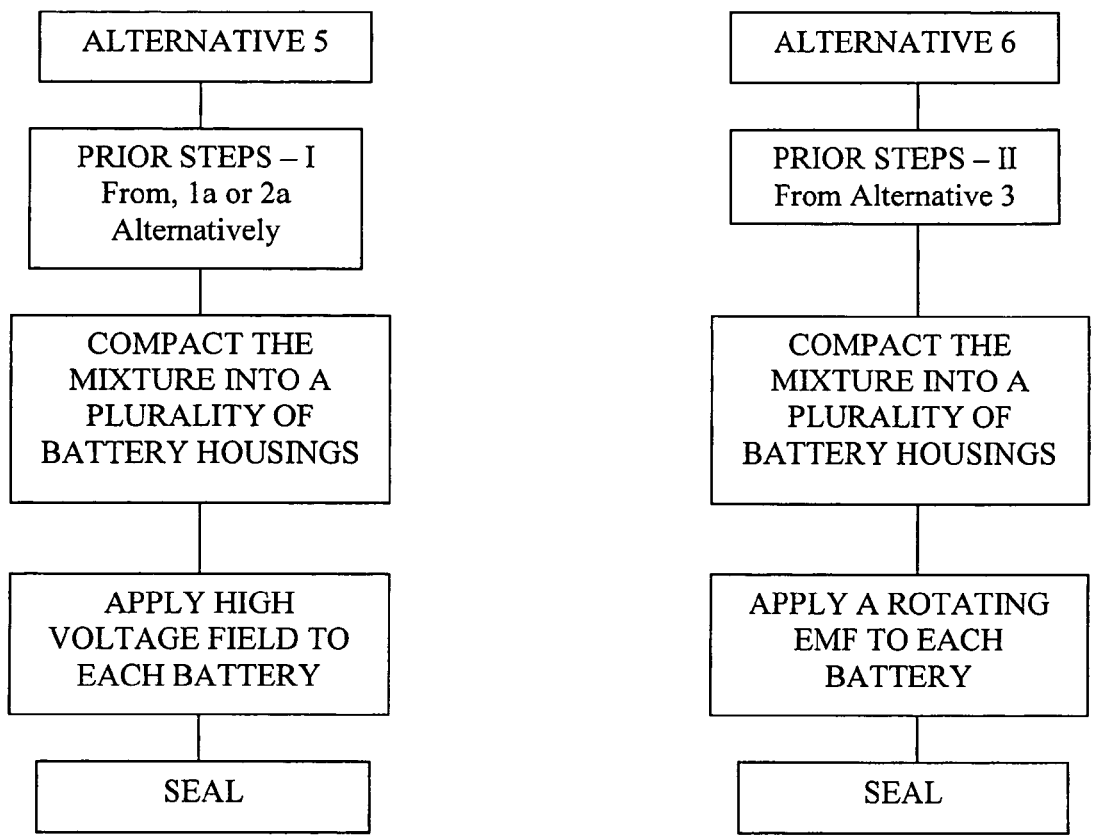
FIG. 7 is a flow chart of the steps for further embodiments of the invention.

FIG. 7 shows a flow chart for the process, when a given volume of material is divided into cells for an integral battery product. In Alternative 5, the PRIOR STEPS-I refers to the previously described Alternatives 1a and 2a as shown if FIG. 2 in which after those steps but before the compacting step, fractional portions of the mixture will be compacted into a plurality of battery housings instead of a single battery housing, and will then be subjected to a high voltage, and then sealed. In Alternative 6, the PRIOR STEPS-II refers to Alternative 3 as shown in FIG. 3 in which after those steps but before the compacting step fractional portions of the mixture into a plurality of battery housings occurs and then each battery is subjected to a rotating EMF and sealed. As described above, in Alternative 6, a further alternative is to apply a high voltage to each battery after the application of REMF; that is replicating Alternative 4 with a plurality of battery housings. Also, each of alternatives 1 and 2 as shown in FIG. 1 can be used for multi-cell manufacture in which the compacting step is in a plurality of battery housings.

Figure 8:
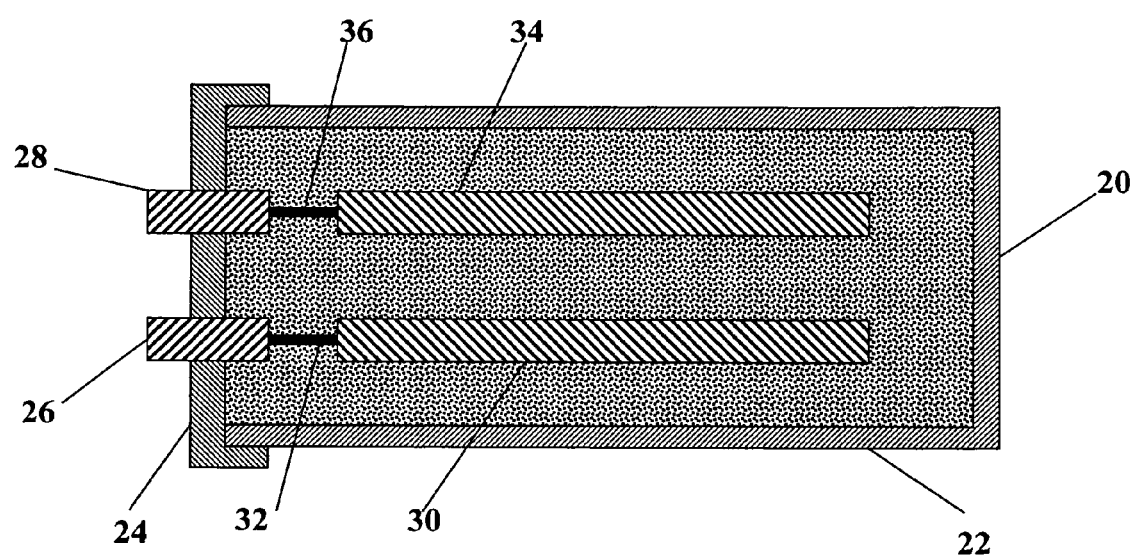
FIG. 8 is a diagrammatic cross section of a battery according to the invention.
Figure 3:
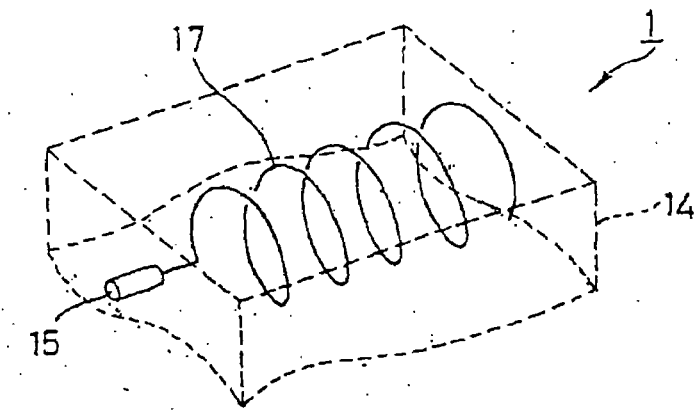
Figure 4:
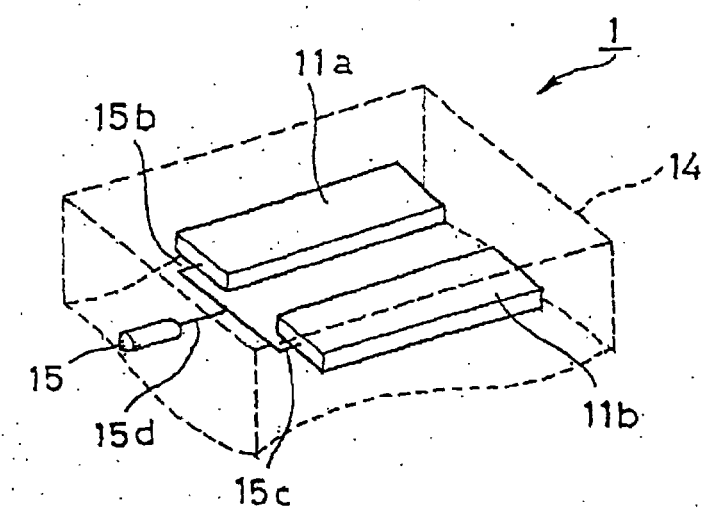
Figure 5:
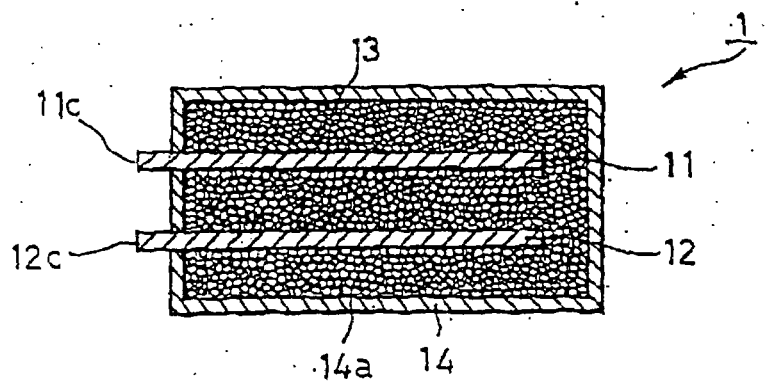
Figure 6:
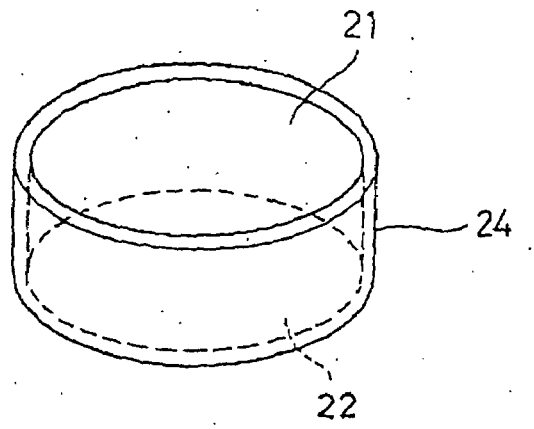
Figure 7:
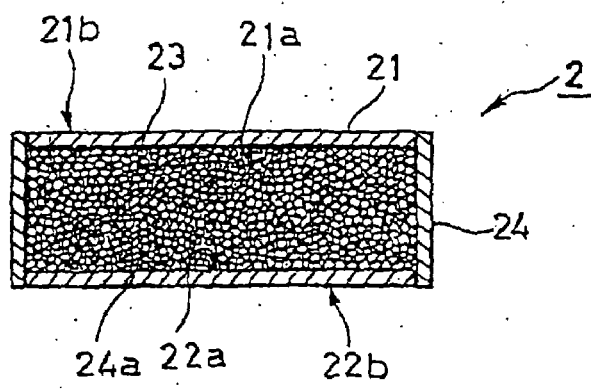
Figure 8:
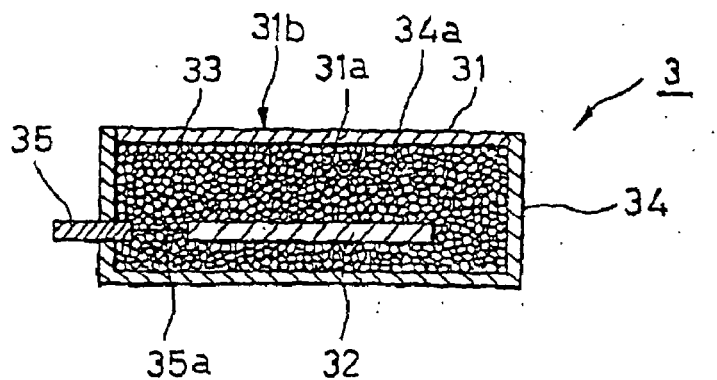

A battery or a cell constructed according to the present invention is shown in FIG. 8 in which a housing 20 is shown, constructed from a non-conductive material and consisting of a solid base 22 and a cap 24. The cap 24 has two holes for the anode lead 26 and the cathode lead 28 respectively. The leads are dimensioned to a size that either meets or exceeds the current requirements of the battery with an appropriate safety margin. The anode lead 26 is connected to anode plate 30 constructed from zinc (Zn) or other adequate material by a connecting element 32. The cathode lead 28 is connected to the cathode plate 34 constructed from copper (Cu), silver (Ag), gold (Au) or other adequate material by a connecting element 36. The cathode plate 34 may be solid or a mesh material to provide a greater contact area. The cathode plate 34 may also be constructed from a carbon material as is found in Leclanche cells. The anode plate 30 and cathode plate 34 are separated in the housing 20 and do not come into contact with each other. The mixture is in place around the anode plate and cathode plate as known in conventional batteries and cells.

The cap 24 is constructed in such a way that when placed base 22 a seal is created. The mineral battery or cell housing can be constructed from a variety of non-conductive materials, including plastic.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . "

MINERAL BATTERY CONSISTING OF POWDER OF POLAR CRYSTAL

DETAILED STATEMENT

TECHNICAL FIELD

This invention is as for mineral battery which consists of powder of polar crystal. This mineral battery makes use of the potencial difference of polar crystal.

BACKGROUND TECHNOLOGY

There are many natural minerals that cause a potencial difference in themselves and of all minerals tourmaline is called as polar crystal because it has always spontaneous electric polarization without placing it in electric field.

ELUCIDATION OF INVENTION

This inventor had manufactured a battery which contained the powder of polar crystal like as tourmaline mentioned above with water more than certain fixed content (Precisely Mineral Battery) and found that it had a enough electromotive force. This invention is based on these knowledges.

Therefore, this invention is concerned with Mineral Battery (Hereafter, call Terminal Type Mineral Battery by this invention) which consists of the powder of polar crystal with water more than 5 mass % for absolute dry weight of this powder that is filled in reception parts of housing which composes of the outer wall of this battery, anode and cathode which are covered and buried in the powder above and terminals which are connected with electrodes above and protruded into the outside through the side wall of housing above.

Moreover, this invention is related to Mineral Battery (Hereafter, call Exposed Electrode Type Mineral Battery) which consists of the exposed plates of anode and cathode, housing that composes the outer wall of this battery together with these electrodes and the powder of polar crystal with water more than 5 mass % for absolute dry weight of this powder which is filled in the reception part of housing above.

Still more, this invention is concerned with Mineral Battery (Hereafter, call Terminal / Exposed Electrode Type Mineral Battery) which consists of the exposed plates of anode and cathode, housing that composes of the outer wall of this battery together with these electrodes, powder of polar crystal with water more than 5 mass % for absolute dry weight of this powder which is filled in reception part of the housing above, electrode that has a opposite polar for the exposed electrode above and covered and buried in powder above Attachment "A"

and terminal which is connected with this electrode in powder, protruding into the outside through the side wall of housing above.

BRIEF EXPLANATION OF DRAWING

Fig.-1 is the rough sketch of diagonal drawing of Terminal Type Mineral Battery.

Fig.-2 is the longitudinal sectional drawing of Terminal Type Mineral Battery shown in Fig.-1.

Fig.-3 is the rough sketch of diagonal drawing of Terminal Type Mineral Battery which has the coil form electrode, being covered and buried in the powder of polar crystal.

Fig.-4 is the rough sketch of diagonal drawing of Terminal Type Mineral Battery with 2 electrode plates covered and buried in the powder of polar crystal.

Fig.-5 is the rough sketch of longitudinal sectional drawing of Terminal Type Mineral Battery in which the end of both electrode plates are protruded into the outside through the side wall of housing.

Fig.-6 is the rough sketch of diagonal drawing of Exposed Electrode Type Mineral Battery.

Fig.-7 is the longitudinal sectional drawing of Exposed Electrode Type Mineral Battery shown in Fig.-6.

Fig.-8 is the rough sketch of longitudinal sectional drawing of Terminal / Exposed Electrode Type Mineral Battery.

BEST FORMS CARRYNG THIS INVENTION INTO EFFECT

The polar crystal which can be used in Mineral Battery in this invention (Precisely, Terminal, Exposed Electrode and Terminal / Exposed Electrode Type Mineral Battery) is not especially limited, however can mention tourmaline for example. Considering tourmaline above, can use the well-known natural tourmaline like as dravite, schorl, uvite and elbaite and also artificial (man-created) tourmaline.

Natural tourmaline occurs in the rocks like as crystalline schist, gneiss, contact metamorphic rocks and granitic pegmatite where the large crystal of tourmaline has been often produced.

The powder of polar crystal to use for Mineral Battery of this invention can be produced by the crushing of polar crystal above. The grain size of this powder is not limited as far as Mineral Battery made by it shows the enough electromotive force for function of itself, however for example, can mention that it's grain size varies from 1 micron to 1 mm.

Attachment "A"

There is no lower limit in the average grain size of powder, however if the average grain size is under 1 micron, can not recognize the increase of electromotive force which is match for the rise of production cost. And, there is no upper limit in the average grain size of powder, but it is over 1 mm, it happens that the electromotive force decreases on occasions due to the air layer. Therefore, the average grain size of powder of polar crystal is desirable between 2 to 5 micron.

Mineral Battery of this invention contains more than 5 mass % of water in the powder of polar crystal "Absolute Dry Weight" in this Detailed Statement of this invention means the mass weight of powder of polar crystal after drying under 105°c during 1 hour.

Therefore, the measurement of water content (M; unit=mass %) is done in the following order. That is to say, measure previously the mass weight of powder of polar crystal containing water (Mo; unit=gram) and then dry it under 105°c during 1 hour and measure again the mass weight of this dried powder (Md; unit=gram). Continuously, calculate the water content by the following formula:

$M = \{ (Mo - Md) / Md \} \times 100$

The water content of powder of polar crystal of Mineral Battery of this invention is not especially limited, if it is more than 5 mass %, however it is desirable to be over 10 mass % and is more desirable if it is more than 15 mass %. And, there is no upper limit of the water content of powder, but it is desirable to be under 30 mass % and is more desirable if it is less than 20 mass %. It is not desirable that the water content of powder is over 30 mass % because it happens that the electrical energy decreases on occations.

The direction of polarization of each grain of powder of polar crystal is disordered when the powder does not contain the water. Meanwhile, it is considered that the powder with more than 5 mass % of water content has a enough electromotive force because each grain of the powder is oriented to the certain direction.

Generally, the powder of polar crystal which is crushed in the air with 60 to 70 % of relative humidity contains approximately 6 to 8 mass % of water content, so that this powder can be used directly for the manufacture of Mineral Battery in this invention without any water addition or can obtain the powder with higher water content if add the certain quantity of water to the powder and knead and mix it well.

Explain the details of each of Mineral Battery of this invention, refering to figures annexed.

Terminal Type Mineral Battery –1 shown in Fig.-1 and Fig.-2 consists of the housing (14), powder of polar crystal with water (13) that is filled in the reception part (14 a) and anode plate (11) and cathode plate (12) which are covered and buried in the powder (13). Anode plate (11) and cathode plate (12) are disposed not to contact directly between each other Attachment "A"

(Disirable to dispose them in parallel). Anode plate (11) and cathode plate (12) can be composed of the materials which have a electro-conductivity (For example: metal or aloy plate, carbon plate or electro-conductive plastic plate). Housing (14) consist of non-electro-conductive material (For example: plastic).

Anode is composed of the materials with high electro-conductivity and cathode consists of the materials with low electro-conductivity in Mineral Battery of this invention. (Precisely Terminal Type Mineral Battery and also Exposed Electrode Type Mineral Battery and Terminal / Exposed Electrode Type Mineral Battery that are mentioned below).

Anode plate (11) is connected electrically with the anode-terminal (15) through the electric conductor wire (15 a) and equally cathode plate (12) is connected with the cathode-terminal (16) through the electric conductor wire (16 a). Anode-terminal (15) and cathode-terminal (16) protrude into the outside of housing (14) throug the piercing hole on the side wall of housing (14) and electrical energy that is generated by Terminal Type Mineral Battery –1 can be supplied to the exterior through anode-terminal (15) and cathode-terminal (16). Powder of polar crystal (13) that is filled in the reception part (14 a) is omitted in Fig.-1 because of showing the disposition condition of the anode plate (11) and cathode plate (12) and also electric conductor wires (15 a and 16 a) in reception part (14).

The form of electrode of Terminal Type Mineral Battery of this invention (Precisely anode plate (11) and cathode plate (12) in Fig.-1 and Fig.-2) is not limited as far as it can be taken in the reception part of housing on condition that it can be contacted with the powder of polar crystal that contains water, however for example, it can be a plate of rectangular form shown in Fig.-1 and Fig.-2 or a plate of square, polygon, round and oval forms or column, oval and polygon pillar forms and also stick and pin forms or straight and curved line forms or coil form shown in Fig.-3 and all combinations of these forms.

Fig.-3 is drawn for the purpose of expressing the form of electrode, so that coil formed electrode (17) and terminal (15) that is connected with the and of this electrode are shown on real line and the upper half part of housing (14) is shown on dotted line and other parts are omitted. This coil formed electrode can be used in both anode or cathode.

The quantity of electrode of each polar, precisely each quantity of anode or cathode is not limited and can set 1 or more anodes and 1 or more cathodes. Fig.-4 shows the rough sketch of Terminal Type Mineral Battery which has 2 electrode plates (11a and 11 b). And this figure is drawn with the object of expressing the quantity and form of electrode and the connecting condition with the terminal, therefore the electrode plates (11 a and 11 b), electric conductor wire (15b, 15c and 15d) and terminal (15) are shown on real line and the upper half of housing (14) is shown on dotted line and other parts are omitted. As shown in Fig.-4, the electrodes (11 a and 11 b) and terminal (15) are connected electrically by the electric conductor wires (15 b, 15 c and 15 d). These electric conductor wires can be connected in the inside of housing (14) shown in Fig.-4 or the electric conductor wires (15 b and 15 c) can be protruded into the outside of housing (14) where these wires are connected with the electric conductor wire (15 d).

Attachment "A"

In Fig.-1 and Fig.-2, anode-terminal (15) and cathode terminal (16) are set apart from anode plate (11) and cathode plate (12), however can protude the end of these electrodes into the outside of housing and use these protruded parts as connecting terminal, shown in Fig.-5.

Terminal Type Mineral Battery –1 shown in Fig.-5 consists of the powder of polar crystal with water (13) that filled in the reception part of housing (14), anode plate (11) and cathode plate (12) which are covered and buried in powder (13) and housing (14). Anode plate (11) and cathode plate (11) are disposed not to contact directly between each other (Disirable to dispose them in parallel). The extremities (11 c and 12 c) of anode plate (11) and cathode plate (12) are protruded into the outside of housing (14) and these extremities have a function of terminal.

The quantity of terminal that takes out the electrical energy to exterior from Terminal Type Mineral Battery in this invention is not limited and for example, can connect one or plural electric conductor wires to anode and these wires are also connected with one or plural anode-terminal and the same system can be applied to cathode-terminal. Generally, if increases the quantity of electric conductor wire which is connected with one electrode (also in the case of quantity of terminal that is connected to these wires), also increases the total amount of electrical energy which can be taken out from one electrode.

The housing which can be used for Terminal Type Mineral Battery is not limited, if it forms on most of the outer wall of battery except the holes for terminal and has a reception part where can receive the powder of polar crystal with water and electrodes (anode and cathode) on the condition that each of electrodes is kept in contact with powder above and the evaporation of water contained in powder is obstructed. The material and form of housing are selected properly according to the form and way of uses.

Exposed Electrode Type Mineral Battery –2 shown in Fig.-6 and Fig.-7 consists of the round form anode plate (21) and the cathode plate (22) that are disposed in parallel, cylindrical frame (24) of which top and bottom are opened and powder of polar crystal with water (23) that is filled in reception part (24 a). Anode plate and cathode plate are able to compose of the electro-conductive material (For example, metal or alloy, carbon plate or electro-conductive plastic plate), the inside surfaces (21 a and 22 a) of anode plate (21) and the cathode plate (22) are in contact with the powder (23), The outside surface of anode plate (21 b) has a function as anode-terminal and the outside surface of cathode plate (22 b) works as cathode-terminal.

Frame (24) is composed of the non-electro-conductive material (For example plastic) and insulates anode plate (21) from cathode plate (22).

The form of anode plate and cathode plate of Exposed Electrode Type Mineral Battery of this invention is not limited, if it has a plate-like form that can constitute the reception parts of powder of polar crystal together with the frame above and for example, it can be round Attachment "A"

or oval, polygon form ( retangular or square etc) and plate-like forms which are combined between them.

And also, the quantity of anode plate and cathode plate is not limited and can be put one or more in each.

Frame used for Exposed Electrode Type Mineral Battery in this invention is not limited, if it constitutes the outer wall of battery together with the exposed anode and cathode plates and has the open parts where are occupied by the exposed anode plate and cathode plate and also, if it forms the reception part together with the exposed anode plate and cathode plate in where the powder of polar crystal with water is kept on the condition that the inside surface of anode and cathode plate is contacted with the powder above and the evaporation of water contained in powder is obstructed and for example, the material and form of this frame are selected properly according to the form and way of uses.

As this type of frame, for example, can mention the case of pipe form which is composed of the non-air through and non-electro-conductive material or non-air through seal ( For example plastic seal).

Terminal / Exposed Electrode Type Mineral Battery –3 shown in Fig.-8 consists of the cubic form receptacle (34) which has one open face where is occupied by anode plate (31) and the powder of polar crystal with water (33) that is filled in the reception part (34 a). Cathode plate (32) is covered and buried in the powder above. This cathode plate (32) is connected electrically with the cathode-terminal (35) through the electro-conductive wire (35 a). Cathode-terminal (35) is fixed, protruding into the outside of receptacle (34). Anode plate (31) and cathode plate (32) is not contacted between them and are composed of the electro-conductive material ( For example, metal or alloy plate, carbon plate or electro-conductive plastic). The inside surface (31 a) of anode plate (31) has a contact with the powder (33). The outside surface (31 b) of anode plate (31) has a function as a anode-terminal.

Terminal / Exposed Electrode Type Mineral Battery in this invention contains: 1 ] anode or cathode which has plate form and one of the surface of this electrode is exposed in outer surface of this battery ( Hereafter call exposed electrode and other surface of this electrode is disposed in contact with the powder of polar crystal and 2 ] electrode that has a opposite polar for exposed electrode above and is disposed in the condition of being covered and buried in the powder of polar crystal ( Hereafter call buried electrode)

The form of exposed electrode above is not especially limited if it can constitute of the reception part in where the powder of polar crystal is kept and for example, it can be round or oval form, plate or polygon form ( square or retangular etc) plate or the combinations among them.

The form of buried electrode above is not expecially limited if it can be kept in the reception part above in the condition of being contacted with the powder of polar crystal and for example, it can be the plate form of square and polygon or column or oval or polygon pillar form or stick or pin form that are composed of the combination of forms Attachment "A"

above or straight or curved line or coil form shown in Fig.-3 or other linear forms which are composed of these lines.

And also, the quantity of buried electrode is especially limited and can be 1 or more.

Terminal also is not limited to the system shown in Fig.-8, and for example, protrude the end of buried electrode into the outside of receptacle and use this protruded part as terminal.

As far Terminal / Exposed Electrode Battery of this invention, can make the anode plate into the buried electrode and the cathode plate into the exposed electrode.

The quantity of thermical which is connected with the buried electrode, taking out the electrical energy into the exterior, is not especially limited in this Terminal / Exposed Electrode Mineral Battery, and can connect plural electro-conductive wires with one buried electrode and these wires are connected again with one or plural terminals.
Generally, if increase the quantity of electro-conductive wire (also, quantity of terminal), the total amount of electrical energy which can be taken from one buried electrode is also increased.

The receptacle to be used in Terminal / Exposed Electrode Type Mineral Battery is not expecially limited if it can form the outer wall of this battery together with the exposed electrode and the reception part where the inside surface of exposed electrode and the buried electrode are contacted with the powder of polar crystal with water and the evaporation of this water is obstructed, also together with exposed electrode. The material and form of this receptacle are slected properly according to the form and way of uses and for example, can mention a case with on open face which is composed of the non-air through material.

As far Mineral Battery in this invention ( Precisely Terminal, Exposed Electrode and Terminal / Exposed Electrode Type Mineral Battery), it is desirable that the powder of polar crystal with water is filled into the reception part on the condition of applying the pressure. The powder of polar crystal with water which is kept under the pressure has a higher electromotive force than the powder without pressure. The strength of this pressure is not especially limited, however it is desirable to have more than 3 Pa.

It is desirable to keep Mineral Battery of this invention on the condition of high temperature when use it because can obtain a higher electromotive force. The way to keep this battery under high temperature is not especially limited and for example, can install heating apparatus directly to battery or keep the space surrounding the battery in high temperature.

The voltage of direct electric current which is taken out from Mineral Battery of this invention decreases gradually according to the passage of time, however if it is stopped to take out electricall energy from this battery and leave it as it is during the certain period and start again to take out electrical energy from it, the voltage of direct electric current which is obtained in this second taking-out of the electrical energy returns to the original Attachment "A"

voltage that is obtained before the decrease of voltage above. As far Mineral Battery in this invention, if leave this battery as it is without taking out the electrical energy during the twice time of the period demanded for taking out the electrical energy, it returns to the original voltage.

Mineral Battery of this invention can be used individually, but also can use the plural connecting in parallel or series.

PRATICAL EXAMPLE

Explain the details of practical example of this invention, however it is not to limit the extent of this invention.

Pratical example –1

Manufactured Terminal Type Mineral Battery shown in Fig.-1 and Fig.-2 for this practical example.

5 grams (including the weight of water) of powder of tourmaline with average grain size of 4 micron which contains 20 mass % of water content was filled up into the cubic form housing made by plastic (Length = 5 cm, Wide = 5 cm, Height = 0.9 cm), applying the pressure upon the powder. Employed the copper plate of rectangular form (Lenght = 3 cm, Wide = 3 cm, Thickness = 0.3 mm) as a anode plate and zinc plate of same size and form as copper plate is used for anode plate.

Connected one electro-conductive wire to each of anode plate and cathode plate and the other end of these electro-conductive wires are connected with one anode-terminal and one cathode terminal

Pratical Example –2

Manufactured Exposed Electrode Type Mineral Battery shown in Fig. –6 and Fig. –7 for this practical example.

5 grams (including the weight of water) of powder of tourmaline with average grain size of 4 micron which contains 20 mass % of water content was put between the copper plate of round sharp (Diameter = 3.3 cm, Thickness = 0.3 mm) and zinc plate of same form and size as copper plate and then sealed the lateral face of this battery by plastic seal, applying the pressure. The thickness of this battery after this sealing was approximately 9 mm.

Attachment "A"

Valuation

The electric current value that was obtained from Mineral Battery of practical example −1 and practical example −2 was measured by digital voltage meter ( VD4C-81, Iwasaki Tsushin made )

As for Terminal Type Mineral Battery of practical example −1, obtained direct electric current of approximately 900 to 1100 m V without the charging and approximately 810 to 830 m V of direct electric current after 3 hours charging by resistor of 10 k ohm. Thereafter, the resistor was taken off and the battery was left as it is during 6 hours and the voltage was measured again and obtained approximately 900 to 1100 m V of direct electric current after this rest.

As for Exposed Electrode Type Mineral Battery of practical example −2, approximately 900 to 950 m V of direct electric current was obtained without the charging and obtained approximately 540 to 670 m V of direct electric current after 3 hours charging by resistor of 10 k ohm. Thereafter, the resistor was taken off during 6 hours and the voltage was measured again after this period and obtained approximately 900 to 950 m V of direct electric current.

POSSIBLE UTILIZATION IN INDUSTRY

Mineral Battery of this invention makes use of polar crystal ( For example tourmaline ), therefore can take out permanently the electrical energy.

The above-mentioned are the explanation of this invention along the specified forms and cases, however the modifications and improvements which are self-evident to this inventor are contained within the extent of this invention.

Attachment "A"

EXTENT OF CLAIM

1. Mineral Battery characterized by consisting of the powder of polar crystal with water content of more than 5 mass % on the basis of absolute dry weight of the powder of polar crystal which is filled in reception part of housing that constitutes virtually of all outer wall, anode and cathode buried in the powder above and terminals which are connected electrically with buried electrodes above and are protruded into the outside through the side wall of housing above.

2. Mineral Battery characterized by consisting of the powder of polar crystal with water content of more than 5 mass % which is filled in reception part where is constituted of the exposed anode plate, cathode plate and housing that forms all outer wall together with these electrodes.

3. Mineral Battery characterized by consisting of the powder of polar crystal with water content of more than 5 mass % which is filled in reception part where is constituted of exposed anode plate or cathode plate and housing that forms all outer wall together with this exposed electrode, electrode which has a opposite polar for the exposed electrode above and is buried in powder of polar crystal above and terminals that are connected electrically with buried electrode above and are protruded into the outside through the side wall of housing above

SUMMARY

Elucidate Mineral Battery (1) which contains powder of polar crystal with water content of more than 5 mass % (13) that is filled in the reception part of housing (14) which constitutes of all outer wall and possesses anode (11) and cathode (12) that are buried in the powder of polar crystal above and terminals (15) and (16) which are connected electrically with buried electrodes above and are protruded into the outside through the side wall of housing above.

Mineral Battery of this invention can take out permanently the electrial energy

Attachment "A"

F I G. 1
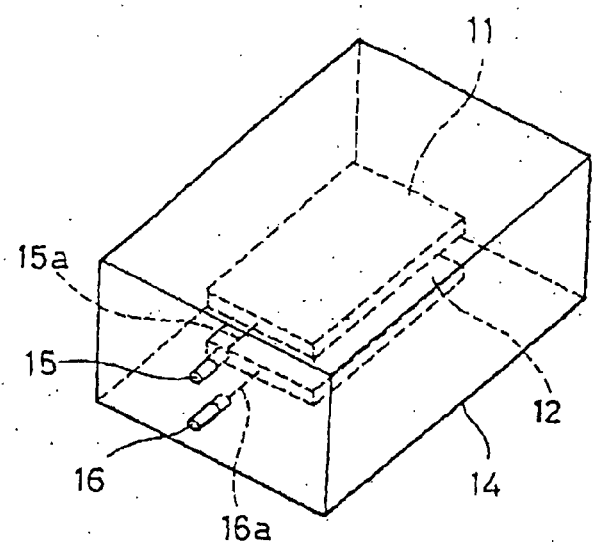
F I G. 2
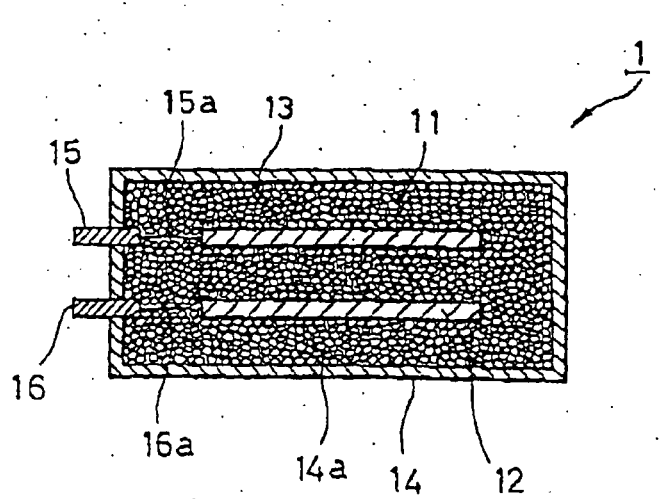
Attachment "A"

Attachment "A"

Attachment "A"

The invention claimed is:
1. A process of creating one or more mineral batteries, comprising:
selected one of the following alternatives;
alternative 1, applying a rotating EMF (REMF) separately to a polar crystal powder and conductive liquid and mixing them to form a powder-liquid mixture; or
alternative 2, combining a polar crystal powder and a conductive liquid to form a powder-liquid mixture and applying an REMF to the powder-liquid mixture;
placing the powder-liquid mixture in at least one battery housing;
compacting the powder-liquid mixture in the at least one battery housing;
sealing the at least one battery housing; and
wherein a cathode and an anode and connections therefore are also provided at an appropriate point in the process to provide at least one complete battery.
2. A process as in claim 1 wherein the polar crystal powder average particle size is from about sub micron size up to about 400 mesh.
3. A process as in claim 1 wherein the polar crystal powder is tourmaline powder.
4. A process as in claim 3 wherein the tourmaline powder average particle size is from about 2 to about 5 microns.
5. A process as in claim 1 wherein the conductive liquid is selected from the group consisting of water and alcohol.
6. A process as in claim 5 wherein the conductive liquid is water in a percentage of 17% to 18% of the mixture.
7. A process as in claim 1 wherein the REMF is applied for a period of at least about 30 minutes.
8. A process as in claim 7 wherein the period consists of a plurality of cycles of exposure, each cycle of exposure involving turning on the REMF for approximately 30 minutes followed by a period of non-exposure for approximately 30 minutes.
9. A process as in claim 1 in which in alternative 2, the conductive liquid is water and the applied REMF frequency to the water is at about 48 to about 800 MHz.
10. A process as in claim 1 in which the compacting is greater than 3 atmospheres.
11. A process as in claim 1 further comprising applying a high voltage field to the powder-liquid mixture of alternate 1 after it has been compacted in the at least one battery housing.
12. A process of claim 1 further comprising applying a high voltage field to the powder-liquid mixture of alternate 2 after compacting the powder-liquid mixture in the at least one battery housing.
13. A process of claim 12 in which the high voltage field is about 50,000 volts.
14. A process of claim 1 wherein the REMF is applied by placement in the center of an REMF mechanism having at least three poles.
15. A process of claim 1 in which in alternative 1, the conductive liquid is water and the applied REMF frequency to the water is from one or more frequencies in the range from about 700 to about 800 MHz.
16. A process of claim 1 in which in alternative 1, the polar crystal powder is tourmaline powder and the applied REMF frequency to the tourmaline is from one or more frequencies in the range from about 750 to about 3 GHz.
17. A process for making one or more mineral batteries comprising;
combining a polar crystal powder and a conductive liquid to form a powder-liquid mixture;
compacting the powder-liquid mixture in at least one battery housing;
applying an REMF to the powder-liquid mixture after it has been compacted in the at least one battery housing;
sealing the at least one battery housing; and
wherein a cathode and an anode and connections therefore are also provided at an appropriate point in the process to provide a complete battery.
18. A process as in claim 17 further comprising applying a high voltage field to the powder-liquid mixture after applying the REMF.
19. A process as in claim 17 wherein the polar crystal powder average particle size is from about sub micron size up to about 400 mesh.
20. A process as in claim 17 wherein the polar crystal powder is tourmaline powder.
21. A process as in claim 20 wherein the tourmaline powder average particle size is from about 2 to about 5 microns.
22. A process as in claim 17 wherein the conductive liquid is selected from the group consisting of water and alcohol.
23. A process as in claim 22 wherein the conductive liquid is water in a percentage of 17% to 18% of the mixture.
24. A process as in claim 17 wherein the REMF is applied for a period of at least about 30 minutes.
25. A process as in claim 24 wherein the period consists of a plurality of cycles of exposure, each cycle of exposure involving turning on the REMF for approximately 30 minutes followed by a period of non-exposure for approximately 30 minutes.
26. A process as in claim 17 wherein the conductive liquid is water and the applied REMF frequency to the water is at about 48 to about 800 MHz.
27. A process as in claim 17 in which the compacting is greater than 3 atmospheres.
28. A process as in claim 17 further comprising applying a high voltage field to the powder-liquid mixture after it has been compacted in the at least one battery housing.
29. A process as in claim 28 in which the high voltage field is about 50,000 volts.
30. A process as in claim 17 wherein the REMF is applied by placement in the center of an REMF mechanism having at least three poles.
31. A process as in claim 17 in which the conductive liquid is water and the polar crystal powder is tourmaline powder and the applied REMF frequency is from one or more frequencies in the range from about 700 to about 800 MHz.

* * * * *